(12) United States Patent
Li et al.

(10) Patent No.: US 10,176,779 B2
(45) Date of Patent: Jan. 8, 2019

(54) DISPLAY APPARATUS

(71) Applicant: Chunghwa Picture Tubes, LTD., Taoyuan (TW)

(72) Inventors: Wei-Lung Li, Taoyuan (TW); Ying-Chung Lo, Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 37 days.

(21) Appl. No.: 15/424,554

(22) Filed: Feb. 3, 2017

(65) Prior Publication Data

US 2018/0166036 A1 Jun. 14, 2018

(30) Foreign Application Priority Data

Dec. 8, 2016 (CN) .......................... 2016 1 1119967

(51) Int. Cl.
| | |
|---|---|
| G09G 3/36 | (2006.01) |
| G02F 1/1362 | (2006.01) |
| G02F 1/1368 | (2006.01) |
| G02F 1/1343 | (2006.01) |

(52) U.S. Cl.
CPC ......... *G09G 3/3677* (2013.01); *G02F 1/1368* (2013.01); *G02F 1/134309* (2013.01); *G02F 1/136286* (2013.01); *G09G 3/3688* (2013.01); *G02F 2201/123* (2013.01); *G09G 2300/0426* (2013.01); *G09G 2310/06* (2013.01); *G09G 2310/08* (2013.01)

(58) Field of Classification Search
None
See application file for complete search history.

(56) References Cited

U.S. PATENT DOCUMENTS

| | | | |
|---|---|---|---|
| 2006/0022202 A1* | 2/2006 | Yu .................... | G02F 1/13624 257/72 |
| 2015/0029170 A1* | 1/2015 | Shin .................. | G09G 3/3648 345/212 |

FOREIGN PATENT DOCUMENTS

TW 201612608 4/2016

* cited by examiner

*Primary Examiner* — Duane N Taylor, Jr.
(74) *Attorney, Agent, or Firm* — J.C. Patents (57) ABSTRACT

A display apparatus including scan lines, data lines, k clock signal lines and pixel groups is provided. k is an integer greater than 1. The pixel groups are respectively driven by the k clock signal lines, the data lines and their corresponding scan lines. Each pixel group includes pixel units respectively disposed at intersections of the corresponding scan lines and data lines. Each pixel unit includes a first switch, a second switch, a third switch, a fourth switch, a first pixel electrode and a second pixel electrode. The switches coupled to the common data line are driven by the scan lines in cooperation with the clock signal lines to reduce output signal lines of the driving circuit and a circuit layout area in favor of achieving a narrow-frame display apparatus and reduction in production cost of the display apparatus.

10 Claims, 11 Drawing Sheets

DISPLAY APPARATUS

CROSS-REFERENCE TO RELATED APPLICATION

This application claims the priority benefit of China application serial no. 201611119967.7, filed on Dec. 8, 2016. The entirety of the above-mentioned patent application is hereby incorporated by reference herein and made a part of this specification.

BACKGROUND

Field of the Invention

The invention relates to an electronic apparatus and more particularly, to a display apparatus.

Description of Related Art

With advances in display technology, displays have played an important role in everyday life. Currently, for artistic demands, most displays require large display areas, and therefore, a development trend toward narrow-frame technology is formed.

Taking a liquid crystal display (LCD) panel for example, it is mainly composed of an active device array substrate, an opposite substrate, and a liquid crystal layer sandwiched between the active device array substrate and the opposite substrate. The active device array substrate may be divided into a display region and a non-display region, where a plurality of pixel units are arranged in an array on the display region, and each of the pixel units includes a thin-film transistor (TFT) and a pixel electrode connected with the TFT. In addition, a plurality of scan lines and a plurality of data lines are disposed in the display region, and the TFT of each pixel unit is electrically connected with its corresponding scan lines and data lines. In the non-display region, signal lines, source drivers and gate drivers are disposed.

When an image screen is displayed on the LCD panel, pixels of each row in the display panel have to be sequentially turned on through the gate drivers, and when being turned on, the pixels of each row receive data voltages provided by the corresponding source drivers. In this way, liquid crystal molecules in the pixels of each row are adaptively arranged according to the received data voltages. However, along with the increase of a resolution of the LCD panel, the numbers of the signals, the gate drivers and the source drivers in the non-display region have to be correspondingly increased, and as a result, an area of the non-display region (or referred to as a frame) is increased. Moreover, production cost of the LCD panel is increased along with the increase of the numbers pf the gate drivers and the source drivers.

SUMMARY

The invention provides a display apparatus capable of effectively reducing a frame area and production cost of a display apparatus.

According to an embodiment of the invention, a display apparatus including a plurality of scan lines, a plurality of data line, k clock signal lines and a plurality of pixel groups, where k is an integer greater than 1. The pixel groups are driven by the k clock signal lines, the data lines and their corresponding scan lines. Each of the pixel groups includes a plurality of pixel units respectively disposed at intersections of the corresponding scan lines and the corresponding data lines. Each of the pixel units includes a first switch, a second switch, a third switch, a fourth switch, a first pixel electrode and a second pixel electrode. The first pixel electrode is coupled to a common data line shared with the second pixel electrode through the first switch and the second switch. The second pixel electrode is coupled to the common data line through the third switch and the fourth switch. A turn-on state of the first switch is controlled by the scan line corresponding to the first switch. A turn-on state of the second switch is controlled by a first clock signal line. A turn-on state of the third switch is controlled by the scan line corresponding to the third switch or a former of the scan lines adjacent to the third switch. When the turn-on state of the third switch is controlled by the corresponding scan line, a turn-on state of the fourth switch is controlled by the second clock signal line, and when the turn-on state of the third switch is controlled by the former of the scan lines adjacent to the third switch, the turn-on state of the fourth switch is controlled by the scan line corresponding to the fourth switch or the first clock signal line.

In an embodiment according to the invention, k is equal to 4. There is a ¼-cycle phase difference between clock signals of adjacent clock signal lines. The scan line corresponding to the first switch is the $n^{th}$ scan line. The first clock signal line is the $m^{th}$ clock signal line. When a remainder of n divided by 4 is not 0, m is equal to the remainder of n divided by 4, and when the remainder of n divided by 4 is 0, m is equal to 4, where m and n are positive integers.

In an embodiment according to the invention, the turn-on state of the third switch is controlled by an $(n-1)^{th}$ scan line, and the turn-on state of the fourth switch is controlled by the $n^{th}$ scan line.

In an embodiment according to the invention, the turn-on state of the third switch is controlled by the $(n-1)^{th}$ scan line, and the turn-on state of the fourth switch is controlled by the $m^{th}$ clock signal line.

In an embodiment according to the invention, the first switch, the second switch, the third switch and the fourth switch are transistor switches.

In an embodiment according to the invention, k is equal to 8. There is a ⅛-cycle phase difference between clock signals of adjacent clock signal lines. The scan line corresponding to the first switch is the $n^{th}$ scan line. The first clock signal line the $m^{th}$ clock signal line, where m is equal to 2 multiplied by v. When a remainder of n divided by 4 is not 0, v is equal to the remainder of n divided by 4, where m and n are positive integers, and when the remainder of n divided by 4 is 0, v is equal to 4. The turn-on state of the third switch is controlled by the $n^{th}$ scan line, and the turn-on state of the fourth switch is controlled by an $(m-1)^{th}$ clock signal line.

In an embodiment according to the invention, k is equal to 8. There is a ⅛-cycle phase difference between clock signals of adjacent clock signal lines. The scan line corresponding to the first switch is the $n^{th}$ scan line. The first clock signal line is the $m^{th}$ clock signal line, where m is equal to 4 multiplied by v. When a remainder of n divided by 2 is not 0, v is equal to the remainder of n divided by 2, where m and n are positive integers, and when the remainder of n divided by 2 is 0, v is equal to 2. The turn-on state of the third switch is controlled by the $n^{th}$ scan line, and the turn-on state of the fourth switch is controlled by an $(m-1)^{th}$ clock signal line.

In an embodiment according to the invention, each of the pixel units further includes a fifth switch, a sixth switch, a seventh switch, an eighth switch, a third pixel electrode and a fourth pixel electrode. The third pixel electrode is coupled to the common data line through the fifth switch and the sixth switch. The fourth pixel electrode is coupled to the common data line through the seventh switch and the eighth switch. A turn-on state of the fifth switch is controlled by the $n^{th}$ scan line. A turn-on state of the sixth switch is controlled by the $(m-2)^{th}$ clock signal line. A turn-on state of the seventh switch is controlled by the $n^{th}$ scan line. A turn-on state of the eighth switch is controlled by the $(m-3)^{th}$ scan line.

In an embodiment according to the invention, the first switch, the second switch, the third switch, the fourth switch, the fifth switch, the sixth switch, the seventh switch and the eighth switch are transistor switches.

In an embodiment according to the invention, a driving circuit is coupled to the scan lines and drives the pixel groups through the scan lines, the data lines and the k clock signal lines.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the exemplary embodiments of the disclosure, examples of which are illustrated in the accompanying drawings. Wherever possible, the same reference numbers are used in the drawings and the description to refer to the same or like parts.

Figure 1:
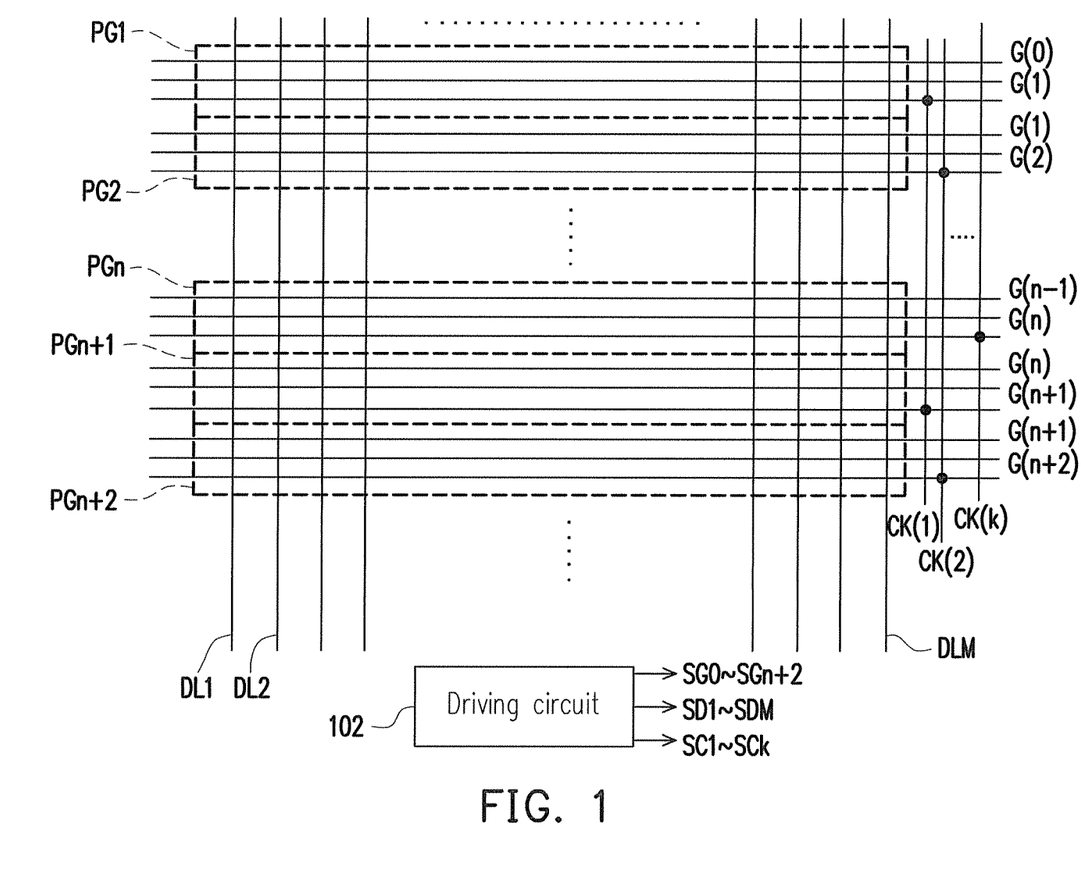
FIG. 1 is a schematic diagram illustrating a display apparatus according to an embodiment of the invention.

FIG. 1 is a schematic diagram illustrating a display apparatus according to an embodiment of the invention. Referring to FIG. 1, a display apparatus is, for example, a liquid crystal display (LCD) apparatus or an electronic paper display apparatus, but the invention is not limited thereto. The display apparatus includes a plurality of scan lines G(0), G(1), G(2) . . . and G(n+2), a plurality of data lines DL1 to DLM, k clock signal lines CK(1) to CK(k), a plurality of pixel groups PG1, PG2 . . . and PGn+2 and a driving circuit 102, where n and m are positive integers, and k is an integer greater than 1. In the present embodiment, k is 4, but the invention is not limited thereto. The driving circuit 102 is coupled to the scan lines G(0) to G(n+2), the data lines DL1 to DLM and the k clock signal lines CK(1) to CK(k) and drives the pixel groups PG1 to PGn+2 through the scan lines G(0) to G(n+2), the data lines DL1 to DLM and the k clock signal lines CK(1) to CK(k). The pixel groups are respectively driven by the clock signal lines CK(1) to CK(k), the data lines DL1 to DLM and the corresponding scan lines. For example, the pixel group PG1 is driven by the clock signal lines CK(1) to CK(k), the data lines DL1 to DLM and the scan lines G(0) and G(1), the pixel group PG2 is driven by the clock signal lines CK(1) to CK(k), the data lines DL1 to DLM and the scan lines G(1) and G(2). It should be noted that FIG. 1 shows two scan lines G(1) may be coupled to a signal output pin of the driving circuit 102 and driven by a scan signal output by the same signal output pin.

Figure 2:
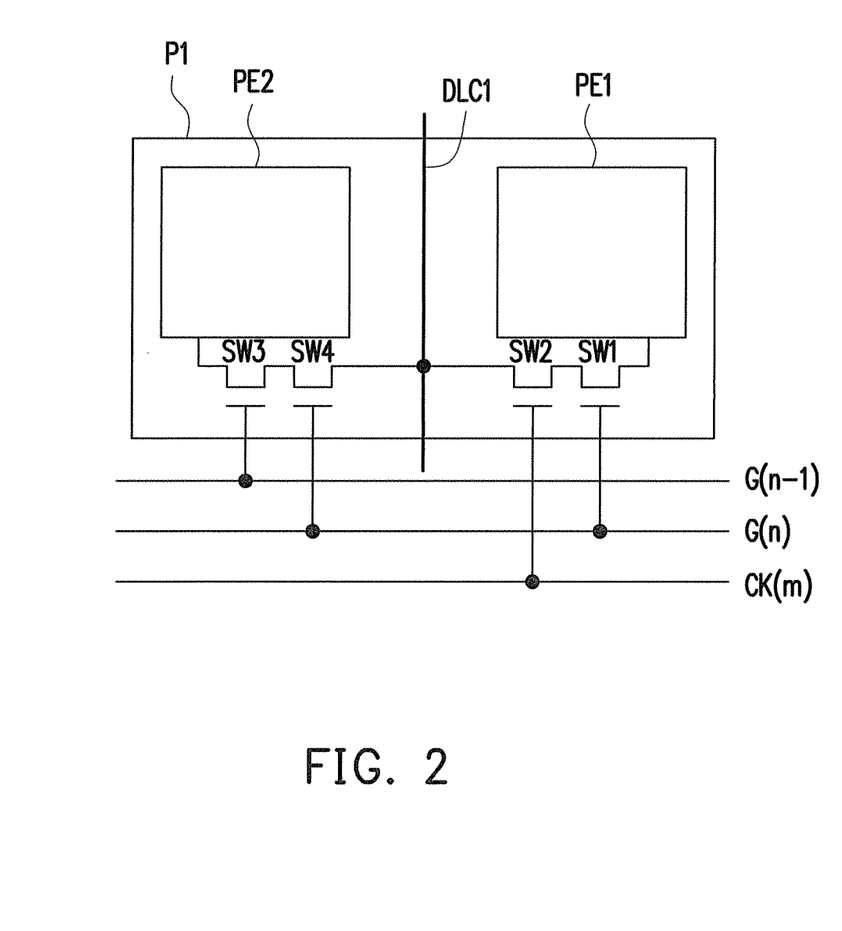
FIG. 2 is a schematic diagram illustrating a pixel circuit according to an embodiment of the invention.

Furthermore, each pixel group may include a plurality of pixel units, and the pixel units may be respectively disposed at intersections of the corresponding scan lines and the corresponding data lines. For example, FIG. 2 is a schematic diagram illustrating a pixel circuit according to an embodiment of the invention. Referring to FIG. 2, in the embodiment illustrated in FIG. 2, the display apparatus includes 4 clock signal lines CK(1) to CK(4), i.e., k is 4. There is a ¼-cycle phase difference between clock signals of adjacent clock signal lines. Each pixel unit P1 in the pixel group includes switches SW1 to SW4 and pixel electrodes PE1 and PE2. The switches SW1 to SW4 may be implemented by, for example, transistor switches, but the invention is not limited thereto. The pixel electrode PE1 is coupled to a common data line DLC1 shared with the pixel electrode PE2 through the switches SW1 and SW2. The common data line DLC1 is the data line corresponding to the pixel unit P1, and as the pixel unit P1 varies, the common data line DLC1 may become one of the data lines DL1 to DLM. The pixel electrode PE2 is coupled to the common data line DLC1 through the switches SW3 and SW4. A turn-on state of the switch SW1 is controlled by the scan line corresponding to the switch SW1 (which is the $n^{th}$ scan line G(n), for example, in an assumption that the pixel unit P1 of the present embodiment belongs to the $n^{th}$ pixel group). A turn-on state of the switch SW2 is controlled by the clock signal line CK(m). When a remainder of n divided by 4 is not 0, m is equal to the remainder of n divided by 4, and when the remainder of n divided by 4 is 0, m is equal to 4, where m and n are positive integers. A turn-on state of the switch SW3 is controlled by the former of the scan lines adjacent to the switch SW3 (which is the $(n-1)^{th}$ scan line G(n-1), for example). A turn-on state of the switch SW4 is controlled by the scan line corresponding to the switch SW4 (which is the $n^{th}$ scan line G(n), for example).

Figure 3:
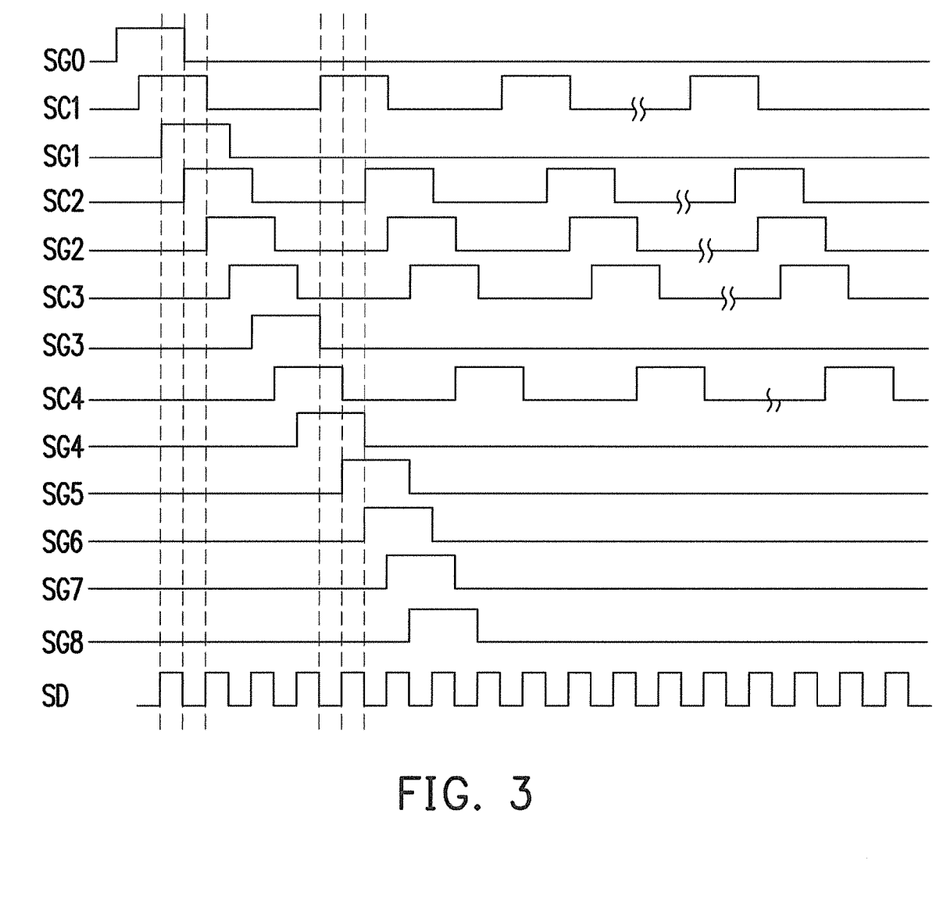
FIG. 3 is a schematic waveform diagram illustrating the scan signals, the data signal and the clock signals according to an embodiment of the invention.

The driving circuit 102 may respectively output scan signals SG0 to SGn+2, data signals SD1 to SDM and clock signals SC1 to SCk through the scan lines G(0) to G(n+2), the data lines DL1 to DLM and the k clock signal lines CK(1) to CK(k) to drive the pixel groups PG1 to PGn+2. For example, FIG. 3 is a schematic waveform diagram illustrating the scan signals, the data signal and the clock signals according to an embodiment of the invention. Referring to FIG. 3, for descriptive convenience, only the scan signals SG0 to SG8 on the scan lines G(0) to G(8), the data signal SD on the common data line DLC1 and the clock signals SC1 to SC4 on the clock signal lines CK(1) to CK(4) are illustrated for description. As illustrated in FIG. 3, there is a ¼-cycle phase difference between the clock signals of adjacent clock signal lines. For example, an interval between two rising edges of the clock signal SC may be divided into 8 equal parts, and a phase delay time of the clock signal SC2 later than the clock signal SC1 is two equal parts of the aforementioned interval. Thus, there is the ¼-cycle phase difference between the clock signal SC1 and the clock signal SC2. When the scan signals SG0 and SG1 are at high voltage levels, the pixel electrode PE2 of the pixel unit P1 in the pixel group PG1 may receive the data signal SD from the common data line DLC1 through the switches SW3 and SW4. When the clock signal SC1 and the scan signal SG1 are at high voltage levels, the pixel electrode PE1 of the pixel unit P1 in the pixel group PG1 may receive the data signal SD from the common data line DLC1 through the switches SW1 and SW2 (in this case, n=1, and m=1). When the scan signals SG1 and SG2 are at high voltage levels, the pixel electrode PE2 of the pixel unit P1 in the pixel group PG2 may receive the data signal SD from the common data line DLC1 through the switches SW3 and SW4. When the clock signal SC2 and the scan signal SG2 are at high voltage levels, the pixel electrode PE1 of the pixel unit P1 in the pixel group PG2 may receive the data signal SD from the common data line DLC1 through the switches SW1 and SW2 (in this case, n=2, and m=2). With inference by analogy, the switches of the pixel unit P1 in each of the pixel groups P3 to PG8 may be controlled by the corresponding scan signals and clock signals to change their turn-on states, such that the pixel groups PG3 to PG8 may sequentially receive the data signal SD to display an image screen corresponding to the data signal SD.

In this way, as the turn-on state of each switch coupled to the common data line is controlled through the scan lines in cooperation with the clock signal lines, only 4 clock signal lines has to be additionally disposed, without additionally disposed scan lines. As such, the number of the data lines may be reduced by a half, and output signals of the driving circuit (which may be implemented by a chip, for example) may be effectively reduced. Thereby, a circuit layout area may be reduced in favor of implementing a narrow-frame display apparatus and reducing production cost of the display apparatus. Taking a display apparatus with a resolution of 240×1440 as an example, if the structure of the present embodiment is applied, the output signal lines of the driving circuit 102 may include only 241 scan lines, 720 data lines and 4 clock signal lines, thereby decreasing 715 output signal lines (calculated by (240+1440)−(241+720+4)=750).

Figure 4:
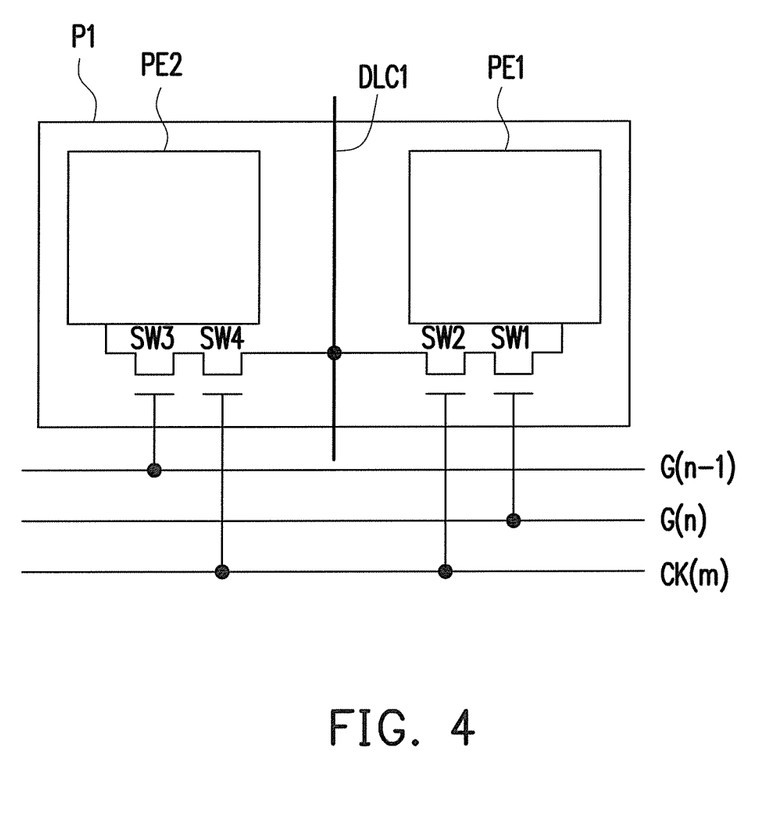
FIG. 4 is a schematic diagram illustrating a pixel circuit according to another embodiment of the invention.
Figure 5:
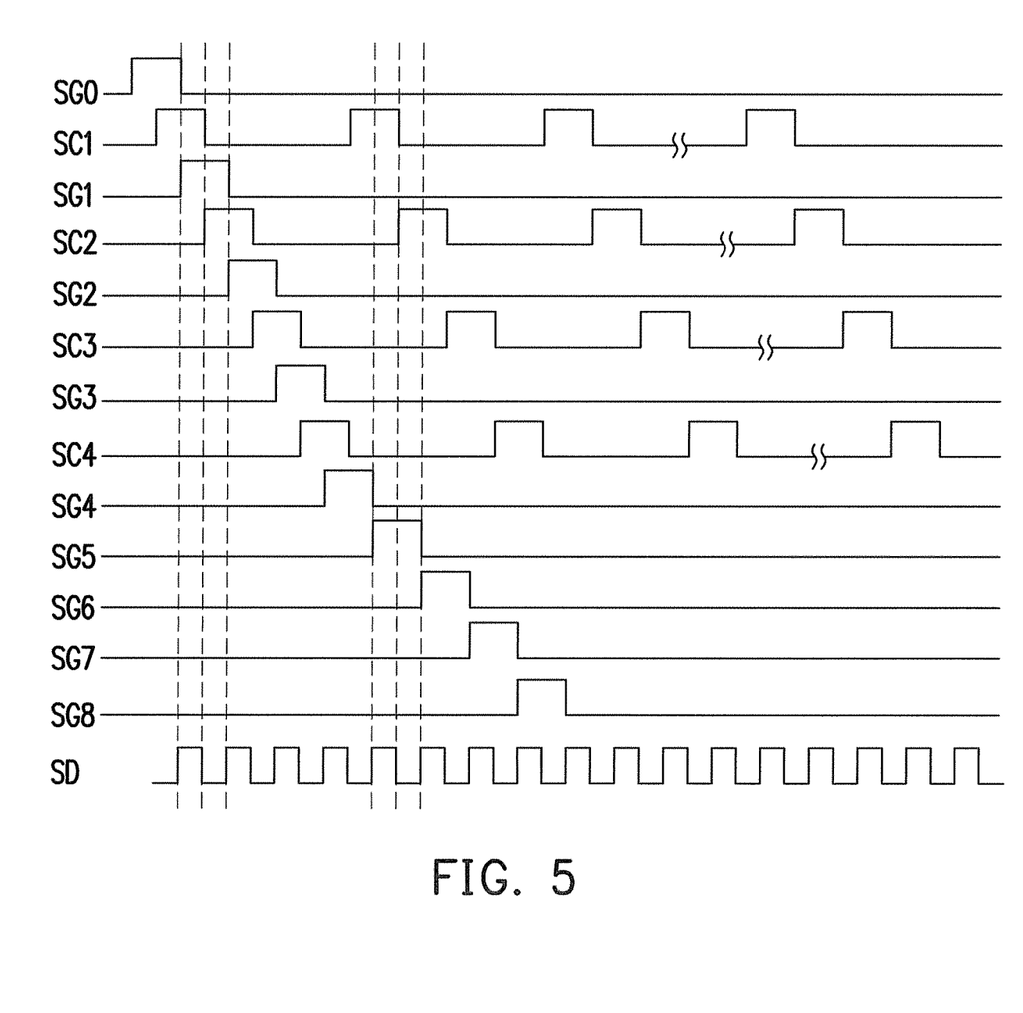
FIG. 5 is a schematic waveform diagram illustrating the scan signals, the data signal and the clock signals according to an embodiment of the invention.

FIG. 4 is a schematic diagram illustrating a pixel circuit according to another embodiment of the invention. Referring to FIG. 4, the difference between a pixel circuit of the present embodiment and the pixel circuit of the embodiment illustrated in FIG. 2 lies in that the turn-on state of the switch SW4 is controlled by the clock signal line CK(m) in the present embodiment. In the present embodiment, when the remainder of n divided by 4 is not 0, m is equal to the remainder of n divided by 4, and when the remainder of n divided by 4 is 0, m is equal to 4, where m and n are positive integers. The schematic waveform diagram of the scan signals, the data signal and the clock signals corresponding to the embodiment depicted in FIG. 4 may be as illustrated in FIG. 5. When the scan signal SG0 and the clock signal SC1 are at high voltage levels, the pixel electrode PE2 of the pixel unit P1 in the pixel group PG1 may receive the data signal SD from the common data line DLC1 through the switches SW3 and SW4. When the clock signal SC1 and the scan signal SG1 are at high voltage levels, the pixel electrode PE1 of the pixel unit P1 in the pixel group PG1 may receive the data signal SD from the common data line DLC1 through the switches SW1 and SW2 (in this case, n=1, and m=1). When the scan signal SG1 and the clock signal SC2 are at high voltage levels, the pixel electrode PE2 of the pixel unit P1 in the pixel group PG2 may receive the data signal SD from the common data line DLC1 through the switches SW3 and SW4. When the clock signal SC2 and the scan signal SG2 are at high voltage levels, the pixel electrode PE1 of the pixel unit P1 in the pixel group PG2 may receive the data signal SD from the common data line DLC1 through the switches SW1 and SW2 (in this case, n=2, and m=2). With inference by analogy, the switches of the pixel unit P1 in each of the pixel groups P3 to PG8 may be controlled by the corresponding scan signals and clock signals to change their turn-on states, such that the pixel groups PG3 to PG8 may sequentially receive the data signal SD to display the image screen corresponding to the data signal SD.

Similarly, the present embodiment may also contribute to effectively reducing the output signal lines of the driving circuit, the circuit layout area and the production cost of the display apparatus. If the structure of the present embodiment is applied, taking the display apparatus with the resolution of 240×1440 as an example, the effect of decreasing 715 output signal lines (calculated by (240+1440)−(241+720+4)=715) may also be achieved.

Figure 6:
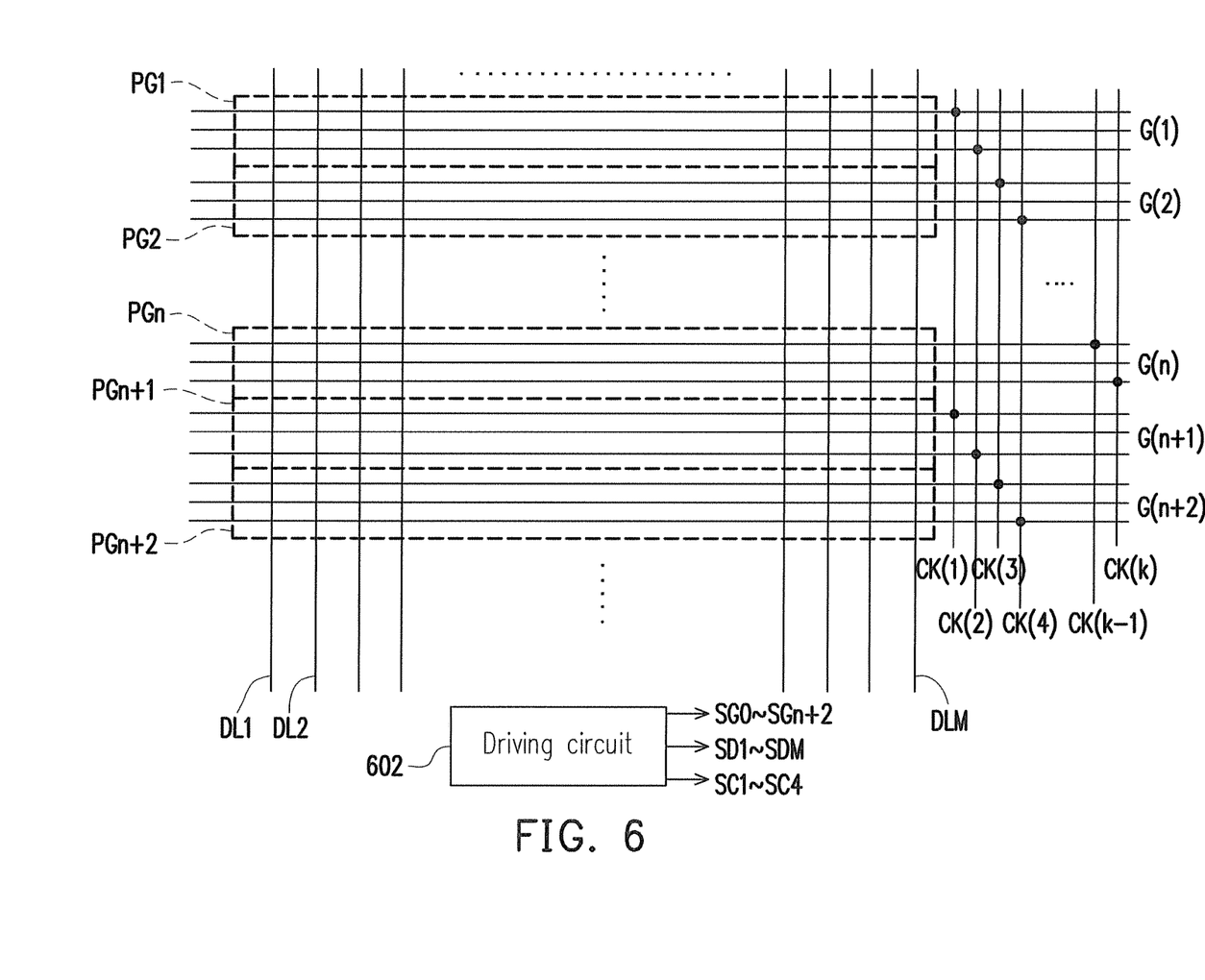
FIG. 6 is a schematic diagram illustrating a display apparatus according to another embodiment of the invention.
Figure 7:
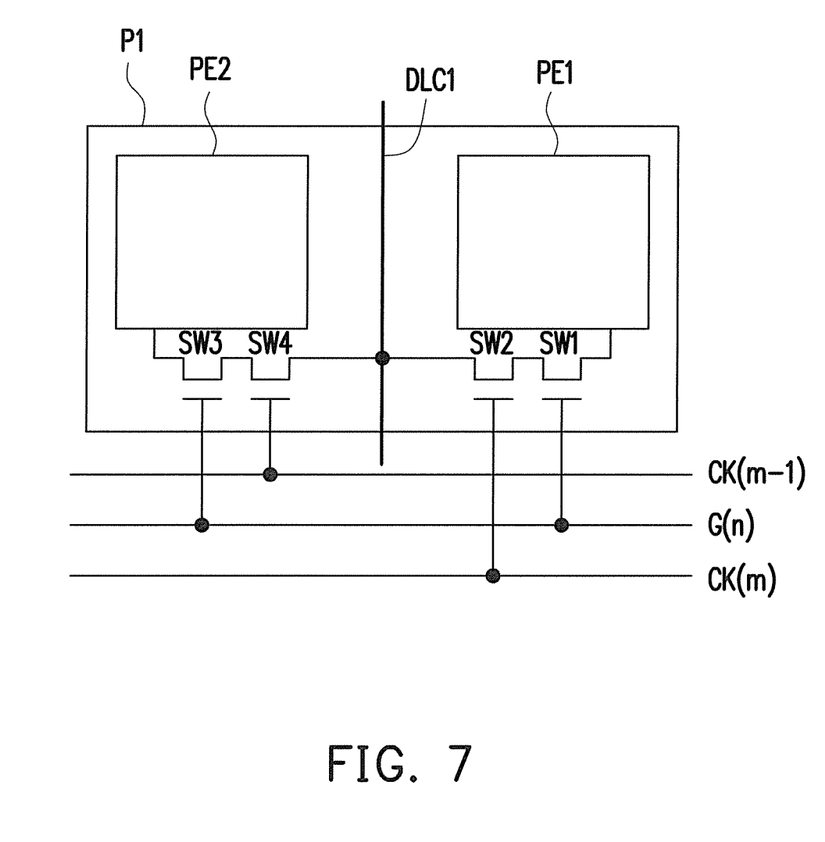
FIG. 7 is a schematic diagram illustrating a pixel circuit according to another embodiment of the invention.

FIG. 6 is a schematic diagram illustrating a display apparatus according to another embodiment of the invention. Referring to FIG. 6, the difference between the present embodiment and the embodiment illustrated in FIG. 1 lies in that k is 8 in the present embodiment, and there is a ⅛-cycle phase difference between clock signals of adjacent clock signal lines (but the invention is not limited thereto). Additionally, each pixel group in the embodiment illustrated in FIG. 1 is driven respectively by two corresponding scan lines in cooperation with one clock signal line, while in the present embodiment, each pixel group is driven respectively by one corresponding scan line in cooperation with two clock signal lines. For example, the pixel group PG1 of the present embodiment is driven by the scan line G(1) and the clock signal lines CK(1) and CK(2). FIG. 7 is a schematic diagram illustrating a pixel circuit according to another embodiment of the invention. Referring to FIG. 7, furthermore, the pixel circuit corresponding to each pixel unit in the pixel groups in the embodiment illustrated in FIG. 6 may be as illustrated in FIG. 7. The difference between the pixel circuit of the embodiment illustrated in FIG. 7 and the pixel circuit of the embodiment illustrated in FIG. 2 lies in that the turn-on state of the switch SW3 is controlled by the scan line corresponding to the switch SW3 (which is the $n^{th}$ scan line G(n), for example, in an assumption that the pixel unit P1 of the present embodiment belongs to the $n^{th}$ pixel group), and the turn-on state of the switch SW4 is controlled by the clock signal line CK(m−1) in the present embodiment. In the present embodiment, m is equal to 2 multiplied by v. When the remainder of n divided by 4 is not 0, v is equal to the remainder of n divided by 4, where m and n are positive integers, and when the remainder of n divided by 4 is 0, v is equal to 4.

Figure 8:
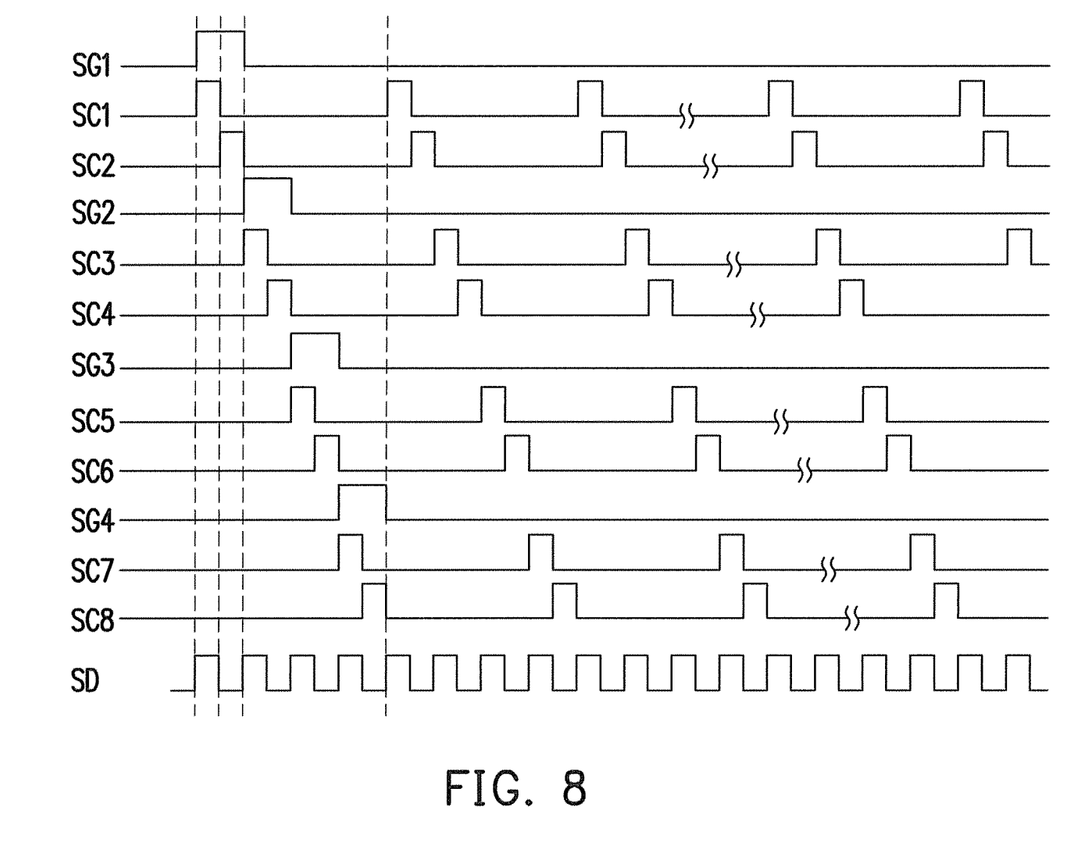
FIG. 8 is a schematic waveform diagram illustrating the scan signals, the data signal and the clock signals according to another embodiment of the invention.

A driving circuit 602 may respectively output the scan signals, the data signals and the clock signals to drive the pixel groups PG1 to PGn+2 through the scan lines G(1) to G(n+2), the data lines DL1 to DLM and the k clock signal lines CK(1) to CK(k). For example, FIG. 8 is a schematic waveform diagram illustrating the scan signals, the data signal and the clock signals according to another embodiment of the invention. The schematic waveform diagram of the scan signals, the data signals and the clock signals corresponding to the embodiments depicted in FIG. 6 and FIG. 7 may be as illustrated in FIG. 8. When the scan signal SG1 and the clock signal SC1 are at high voltage levels, the pixel electrode PE2 of the pixel unit P1 in the pixel group PG1 may receive the data signal SD from the common data line DLC1 through the switches SW3 and SW4. When the clock signal SC2 and the scan signal SG1 are at high voltage levels, the pixel electrode PE1 of the pixel unit P1 in the pixel group PG1 may receive the data signal SD from the common data line DLC1 through the switches SW1 and SW2 (in this case, n=1, and m=2). When the scan signal SG2 and the clock signal SC3 are at high voltage levels, the pixel electrode PE2 of the pixel unit P1 in the pixel group PG2 may receive the data signal SD from the common data line DLC1 through the switches SW3 and SW4. When the clock signal SC4 and the scan signal SG2 are at high voltage levels, the pixel electrode PE1 of the pixel unit P1 in the pixel group PG2 may receive the data signal SD from the common data line DLC1 through the switches SW1 and SW2 (in this case, n=2, and m=4). With inference by analogy, the switches of the pixel unit P1 in each of the pixel groups P3 to PG8 may be controlled by the corresponding scan signals and clock signals to change their turn-on states, such that the pixel groups PG3 to PG8 may sequentially receive the data signal SD to display the image screen corresponding to the data signal SD.

Similarly, the present embodiment may also contribute to effectively reducing the output signal lines of the driving circuit, the circuit layout area and the production cost of the display apparatus. If the structure of the present embodiment is applied, taking the display apparatus with the resolution of 240×1440 as an example, the output signal lines of the driving circuit 602 may include only 240 scan lines, 720 data lines and 8 clock signal lines, thereby decreasing 712 output signal lines (calculated by (240+1440)−(240+720+8)=712).

Figure 9:
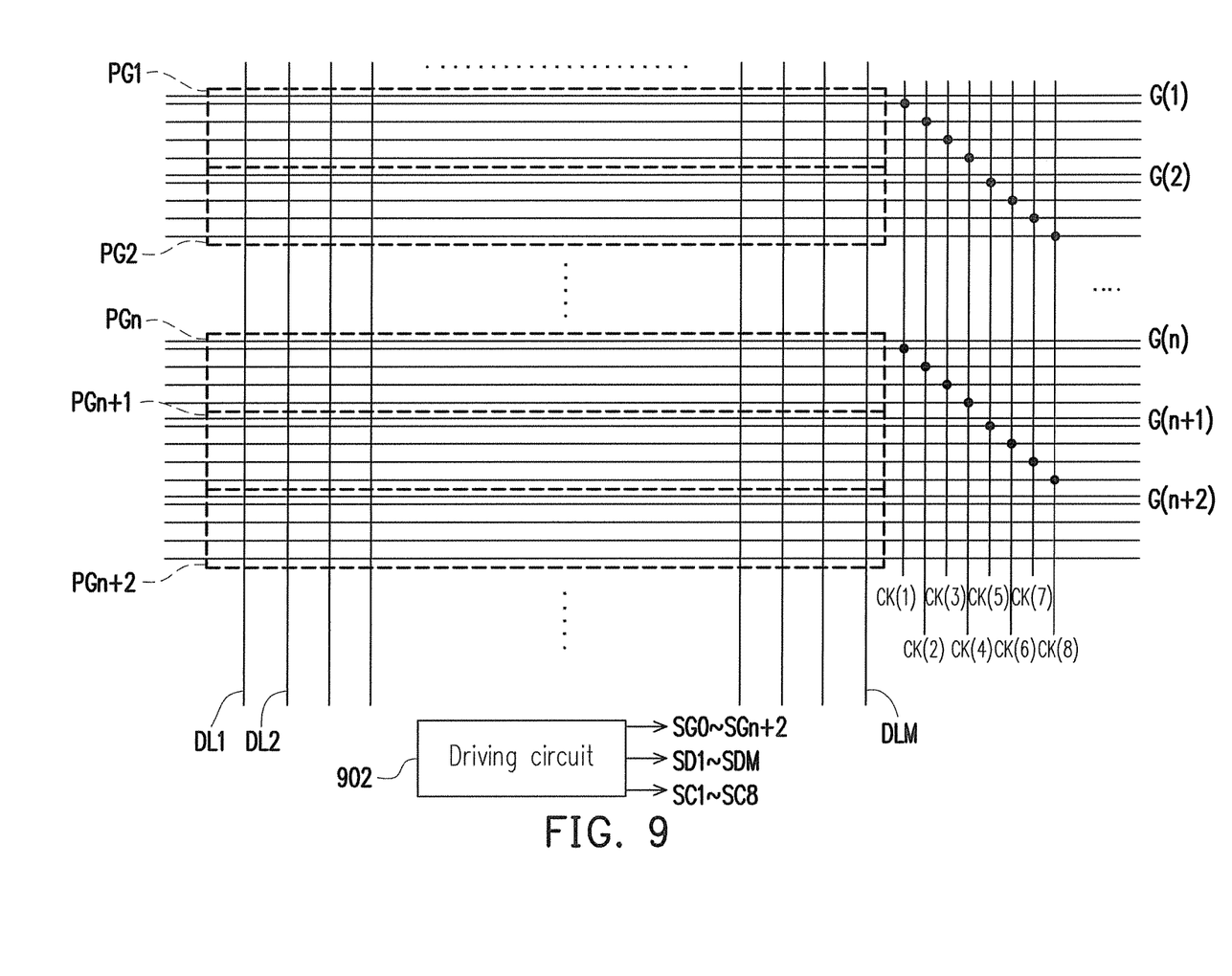
FIG. 9 is a schematic diagram illustrating a display apparatus according to another embodiment of the invention.
Figure 10:
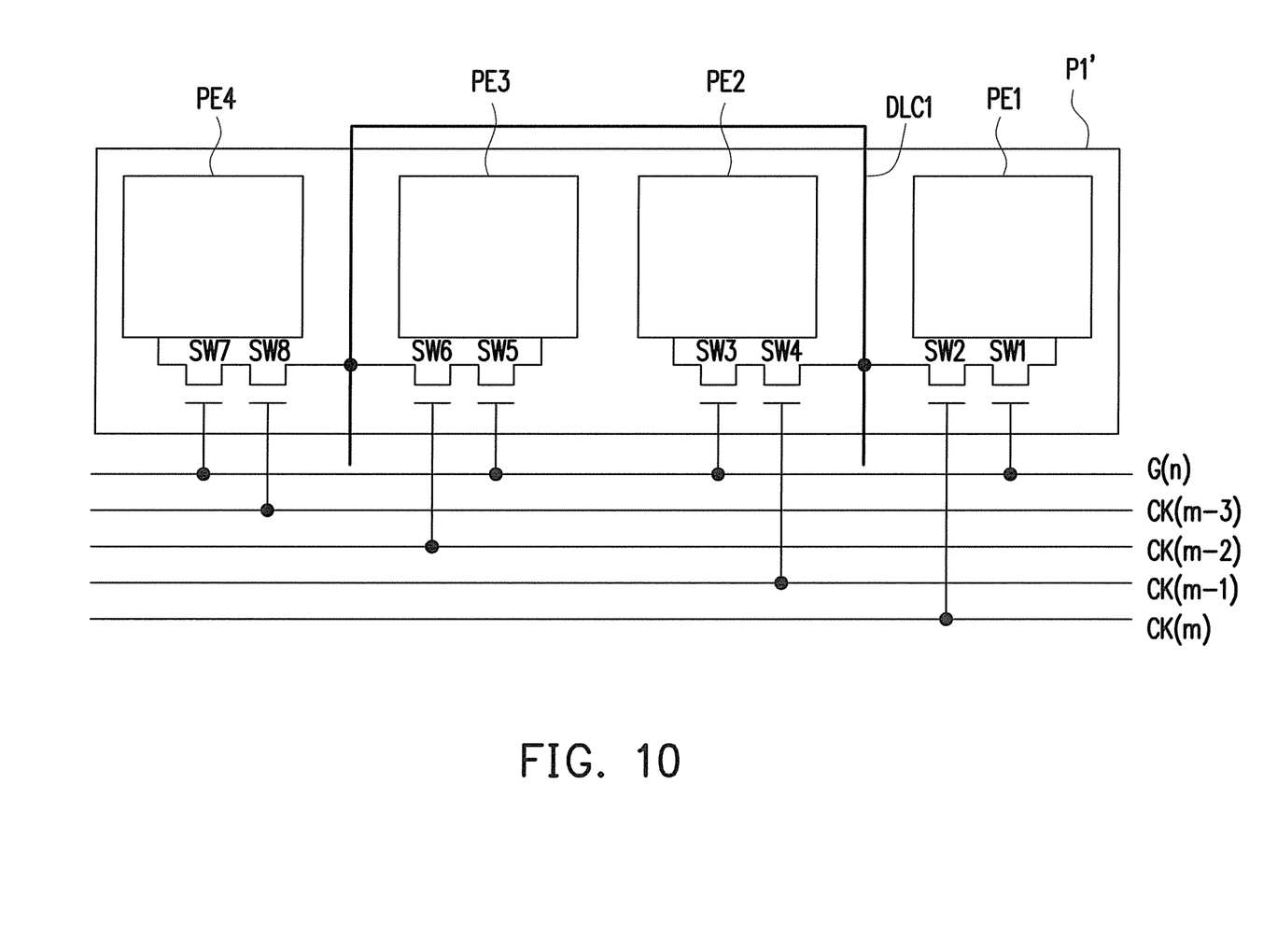
FIG. 10 is a schematic diagram illustrating a pixel circuit according to another embodiment of the invention.

FIG. 9 is a schematic diagram illustrating a display apparatus according to another embodiment of the invention. Referring to FIG. 9, in the present embodiment, k is 8, and there is a ⅛-cycle phase difference between clock signals of adjacent clock signal lines (but the invention is not limited thereto). The difference between the present embodiment and the embodiment illustrated in FIG. 1 lies in that each pixel group in the embodiment illustrated in FIG. 1 is driven respectively by one corresponding scan line in cooperation with two clock signal lines, while in the present embodiment, each pixel group is driven respectively by one corresponding scan line in cooperation with four clock signal lines. For example, the pixel group PG1 of the present embodiment is driven by the scan line G(1) and the clock signal lines CK(1) to CK(4). FIG. 10 is a schematic diagram illustrating a pixel circuit according to another embodiment of the invention. Referring to FIG. 10, furthermore, the pixel circuit corresponding to each pixel unit in the pixel groups in the embodiment illustrated in FIG. 9 may be as illustrated in FIG. 10. The difference between the pixel circuit of the embodiment illustrated in FIG. 10 and the pixel circuit of the embodiment illustrated in FIG. 7 lies in a pixel unit P1' of the present embodiment further including switches SW5 to SW8 and pixel electrodes PE3 and PE4. The switches SW5 to SW8 may also be implemented by, for example, transistor switches, but the invention is not limited thereto. The pixel electrode PE3 is coupled to the common data line DLC1 shared with the pixel electrode PE3 through the switches SW5 and SW6, and the pixel electrode PE4 is coupled to the common data line DLC1 through the switches SW7 and SW8. A turn-on state of the switch SW5 is controlled by the scan line corresponding to the switch SW5 (which is the $n^{th}$ scan line G(n), for example, in an assumption that the pixel unit P1 of the present embodiment belongs to the $n^{th}$ pixel group). A turn-on state of the switch SW6 is controlled by the clock signal line CK(m−2). In the present embodiment, m is equal to 4 multiplied by v. When the remainder of n divided by 2 is not 0, v is equal to the remainder of n divided by 2, where m and n are positive integers, and when the remainder of n divided by 2 is 0, v is equal to 2. A turn-on state of the switch SW7 is controlled by the scan line corresponding to the switch SW7 (which is the $n^{th}$ scan line G(n)). A turn-on state of the switch SW8 is controlled by the clock signal line CK(m−3).

Figure 11:
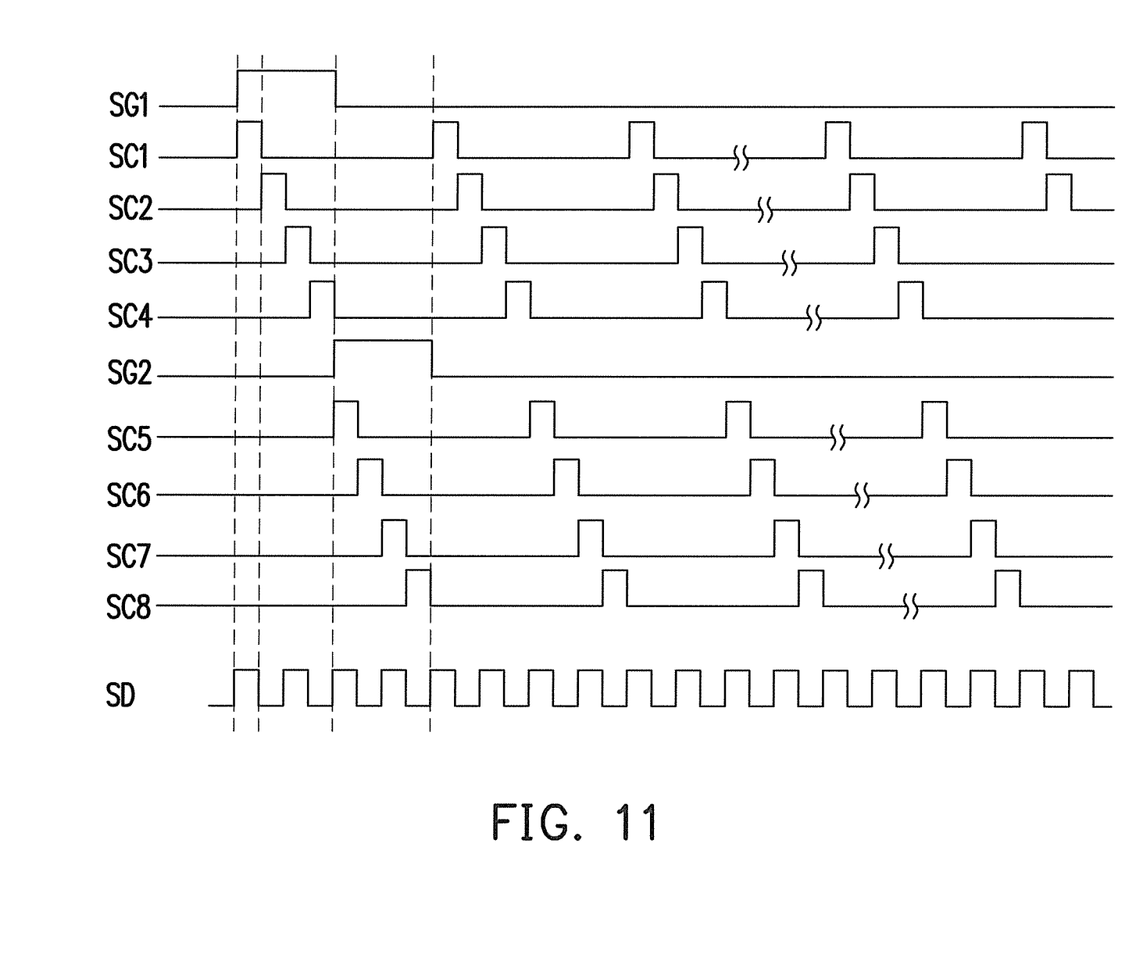
FIG. 11 is a schematic waveform diagram illustrating the scan signals, the data signal and the clock signals according to another embodiment of the invention.

The driving circuit 902 may respectively output the scan signals, the data signals and the clock signals to drive the pixel groups PG1 to PGn+2 through the scan lines G(1) to G(n+2), the data lines DL1 to DLM and 8 clock signal lines CK(1) to CK(8). FIG. 11 is a schematic waveform diagram illustrating the scan signals, the data signal and the clock signals according to another embodiment of the invention. The schematic waveform diagram of the scan signals, the data signals and the clock signals corresponding to the embodiments depicted in FIG. 9 and FIG. 10 may be as illustrated in FIG. 11. When the scan signal SG1 and the clock signal SC1 are at high voltage levels, the pixel electrode PE4 of the pixel unit P1' in the pixel group PG1 may receive the data signal SD from the common data line DLC1 through the switches SW7 and SW8. When the clock signal SC2 and the scan signal SG1 are at high voltage levels, the pixel electrode PE3 of the pixel unit P1' in the pixel group PG1 may receive the data signal SD from the common data line DLC1 through the switches SW5 and SW6. When the scan signal SG1 and the clock signal SC3 are at high voltage levels, the pixel electrode PE2 of the pixel unit P1' in the pixel group PG1 may receive the data signal SD from the common data line DLC1 through the switches SW3 and SW4. When the clock signal SC4 and the scan signal SG1 are at high voltage levels, the pixel electrode PE1 of the pixel unit P1' in the pixel group PG1 may receive the data signal SD from the common data line DLC1 through the switches SW1 and SW2 (in this case, n=1, and m=4). With inference by analogy, the switches of the pixel unit P1' in the pixel group PG2 may be controlled by the corresponding scan signals and clock signals to change their turn-on states, such that the pixel group PG2 may sequentially receive the data signal SD to display the image screen corresponding to the data signal SD.

Similarly, the present embodiment may also contribute to effectively reducing the output signal lines of the driving circuit, the circuit layout area and the production cost of the display apparatus. If the structure of the present embodiment is applied, taking the display apparatus with the resolution of 240×1440 as an example, the output signal lines of the driving circuit 602 may include only 240 scan lines, 360 data lines and 8 clock signal lines, so as to achieve the effect of decreasing 1072 output signal lines (calculated by (240+1440)−(240+360+8)=1072).

Based on the above, in the embodiments of the invention, the turn-on states of the switches coupled to the common data line are controlled by the scan lines in cooperation with the clock signal lines, which can contribute to effectively reducing the output signal lines of the driving circuit and the circuit layout area in favor of achieving the narrow-frame display apparatus and the reduction in the production cost of the display apparatus.

Finally, it should be noted that the embodiments above are merely used for describing the technical features of the invention, instead of limiting the invention. Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display apparatus, comprising:
   a plurality of scan lines;
   a plurality of data lines;
   k clock signal lines, wherein k is an integer greater than 1; and
   a plurality of pixel groups, respectively driven by the k clock signal lines, the data lines and their corresponding scan lines, each of the pixel groups comprising:
   a plurality of pixel units, respectively disposed at intersections of the corresponding scan lines and the corresponding data lines, each of the pixel unit comprising:
   a first switch;
   a second switch;
   a third switch;
   a fourth switch;
   a first pixel electrode; and
   a second pixel electrode,
   wherein the first pixel electrode is coupled to a common data line shared with the second pixel electrode through the first switch and the second switch, the second pixel electrode is coupled to the common data line through the third switch and the fourth switch, a turn-on state of the first switch is controlled by the scan line corresponding to the first switch, the scan line corresponding to the first switch is the nth scan line, a turn-on state of the second switch is controlled by a first clock signal line which is selected from the k clock signal lines according to n, and a turn-on state of the third switch is controlled by the scan line corresponding to the third switch or a former of the scan lines adjacent to the third switch,
   wherein when the turn-on state of the third switch is controlled by the corresponding scan line, a turn-on state of the fourth switch is controlled by the second clock signal line, and when the turn-on state of the third switch is controlled by the former of the scan lines adjacent to the third switch, the turn-on state of the fourth switch is controlled by the scan line corresponding to the fourth switch or the first clock signal line.

2. The display apparatus according to claim 1, wherein k is equal to 4, there is a ¼-cycle phase difference between clock signals of adjacent clock signal lines, the first clock signal line is the mth clock signal line, wherein when a remainder of n divided by 4 is not 0, m is equal to the remainder of n divided by 4, and when the remainder of n divided by 4 is 0, m is equal to 4, wherein m and n are positive integers.

3. The display apparatus according to claim 2, wherein the turn-on state of the third switch is controlled by an (n−1)th scan line, and the turn-on state of the fourth switch is controlled by the nth scan line.

4. The display apparatus according to claim 2, wherein the turn-on state of the third switch is controlled by the (n−1)th scan line, and the turn-on state of the fourth switch is controlled by the mth clock signal line.

5. The display apparatus according to claim 1, wherein the first switch, the second switch, the third switch and the fourth switch are transistor switches.

6. The display apparatus according to claim 1, wherein k is equal to 8, there is a ⅛-cycle phase difference between clock signals of adjacent clock signal lines, the first clock signal line is the mth clock signal line, wherein m is equal to 2 multiplied by v, when a remainder of n divided by 4 is not 0, v is equal to the remainder of n divided by 4, wherein m and n are positive integers, and when the remainder of n divided by 4 is 0, v is equal to 4, the turn-on state of the third switch is controlled by the nth scan line, and the turn-on state of the fourth switch is controlled by an (m−1)th clock signal line.

7. The display apparatus according to claim 1, wherein k is equal to 8, there is a ⅛-cycle phase difference between clock signals of adjacent clock signal lines, the first clock signal line is the mth clock signal line, wherein m is equal to 4 multiplied by v, when a remainder of n divided by 2 is not 0, v is equal to the remainder of n divided by 2, wherein m and n are positive integers, and when the remainder of n divided by 2 is 0, v is equal to 2, the turn-on state of the third switch is controlled by the nth scan line, and the turn-on state of the fourth switch is controlled by an (m−1)th clock signal line.

8. The display apparatus according to claim 7, wherein each of the pixel units further comprises:
   a fifth switch;
   a sixth switch;
   a seventh switch;
   an eighth switch;
   a third pixel electrode; and
   a fourth pixel electrode,
   wherein the third pixel electrode is coupled to the common data line through the fifth switch and the sixth switch, the fourth pixel electrode is coupled to the common data line through the seventh switch and the eighth switch, a turn-on state of the fifth switch is controlled by the nth scan line, the turn-on state of the sixth switch is controlled by the (m−2)th clock signal line, a turn-on state of the seventh switch is controlled by the nth scan line, and a turn-on state of the eighth switch is controlled by the (m−3)th scan line.

9. The display apparatus according to claim 8, wherein the first switch, the second switch, the third switch, the fourth switch, the fifth switch, the sixth switch, the seventh switch and the eighth switch are transistor switches.

10. The display apparatus according to claim 1, further comprising:
    a driving circuit, coupled to the scan lines, the data lines and the k clock signal lines and driving the pixel groups through the scan lines, the data lines and the k clock signal lines.

* * * * *